Oct. 6, 1964  D. SINKLER  3,152,205
METHOD OF MAKING A VALVE
Original Filed Dec. 13, 1956  5 Sheets-Sheet 1
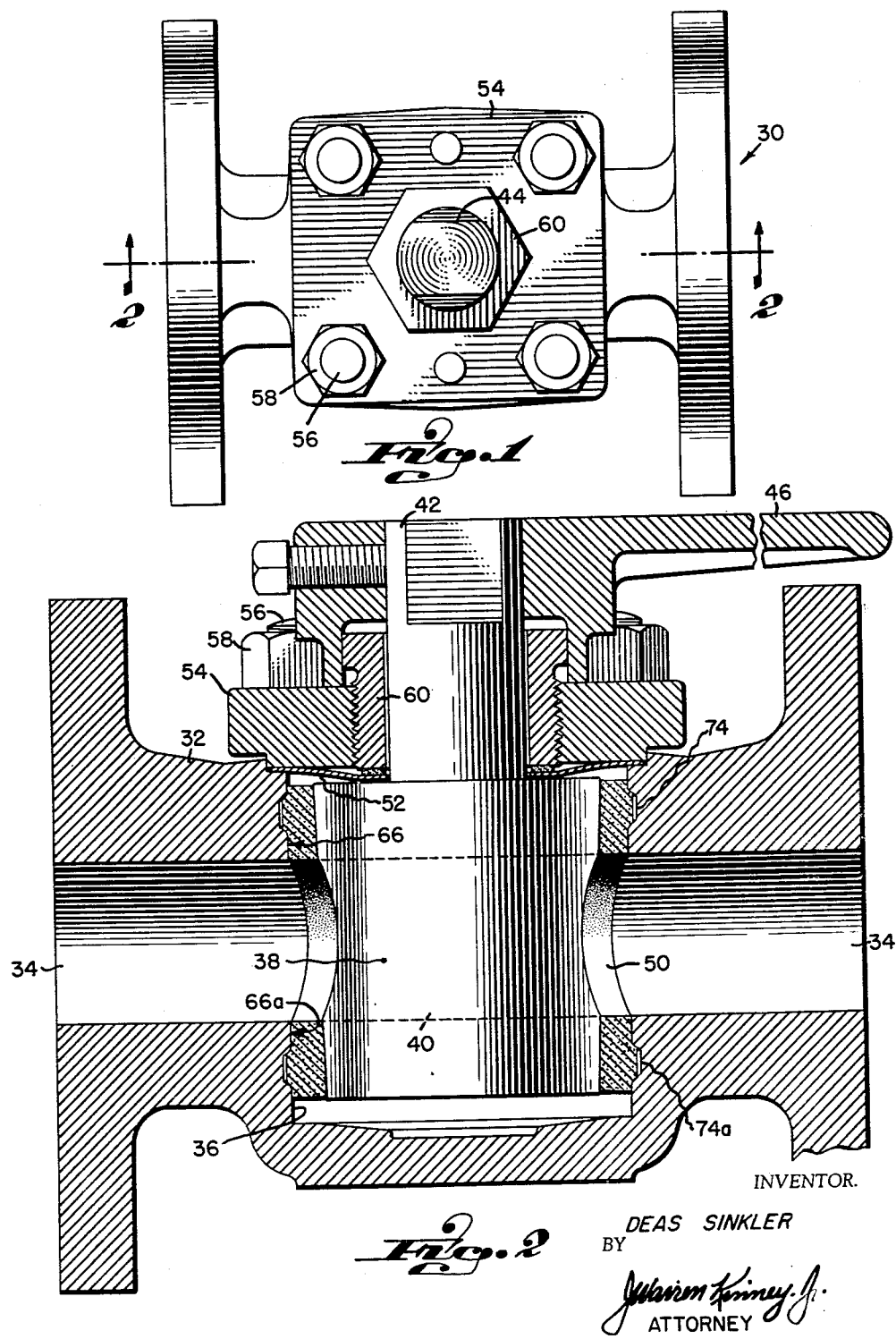
INVENTOR.
DEAS SINKLER
BY
ATTORNEY Oct. 6, 1964    D. SINKLER    3,152,205
METHOD OF MAKING A VALVE
Original Filed Dec. 13, 1956                 5 Sheets-Sheet 2
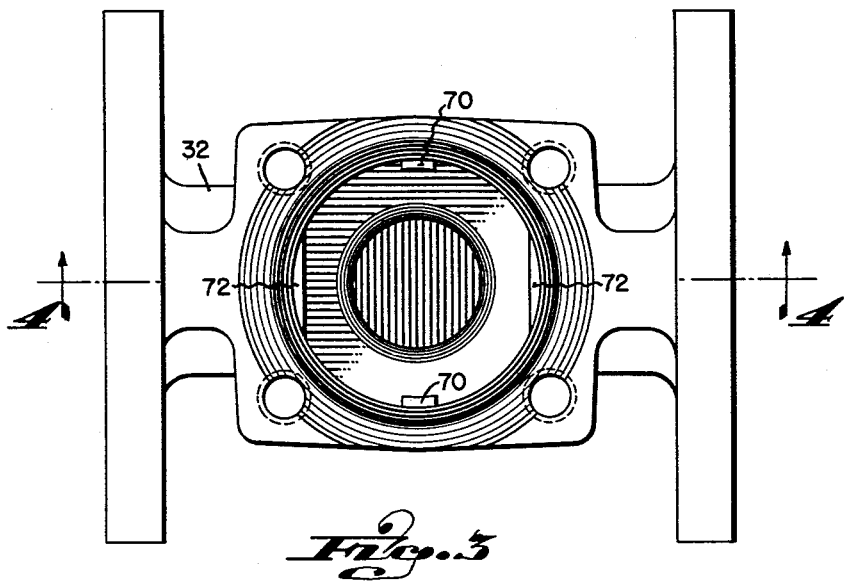
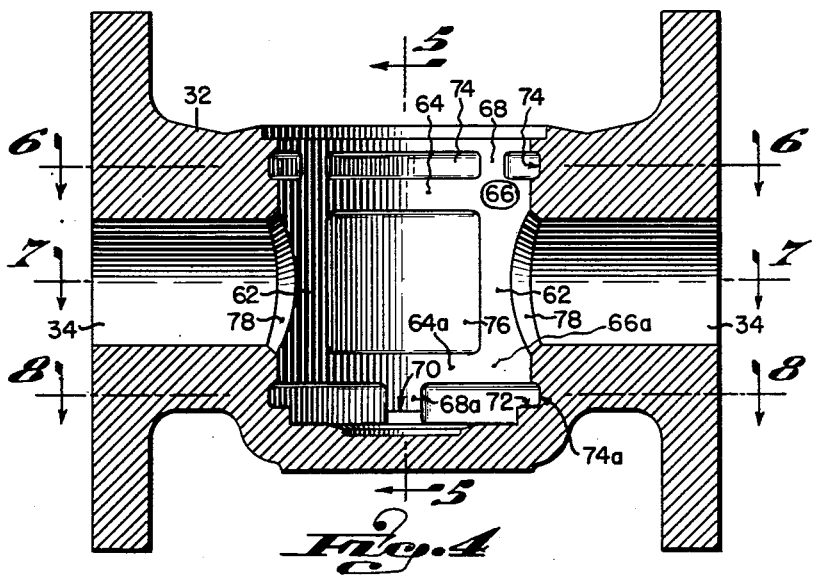
INVENTOR.
DEAS SINKLER
BY
*J. Warren Kinney Jr.*
ATTORNEY

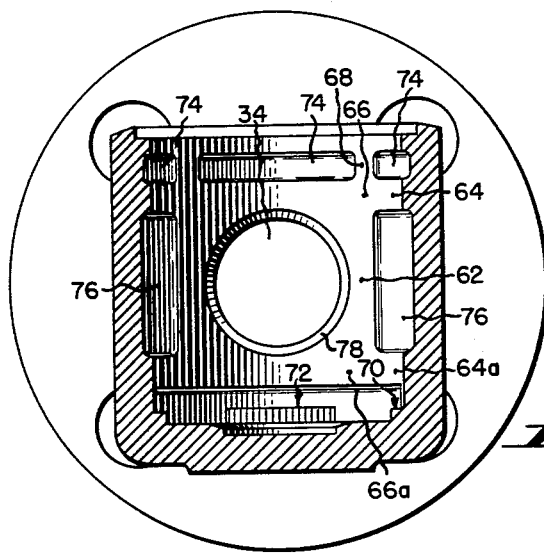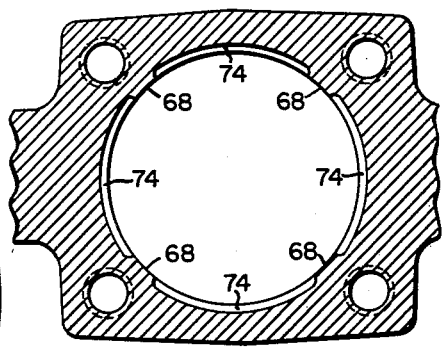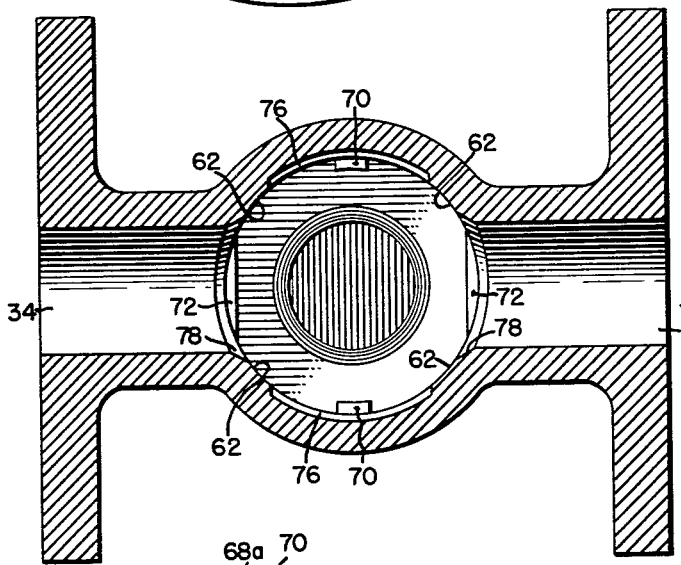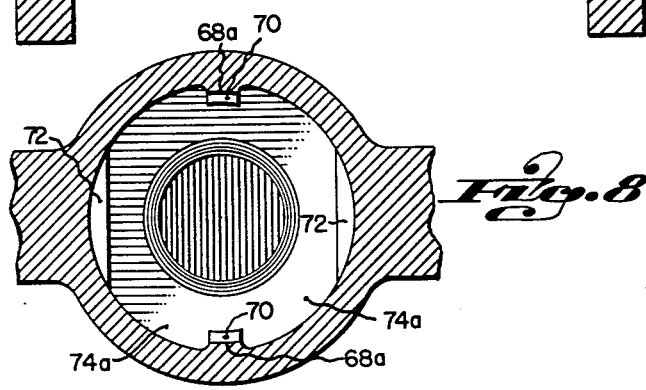

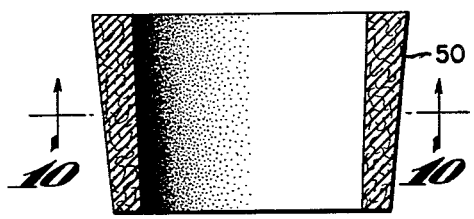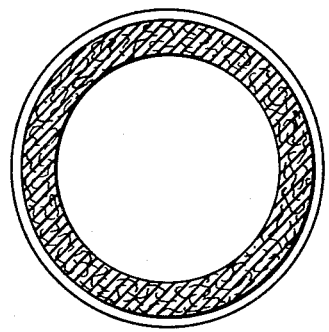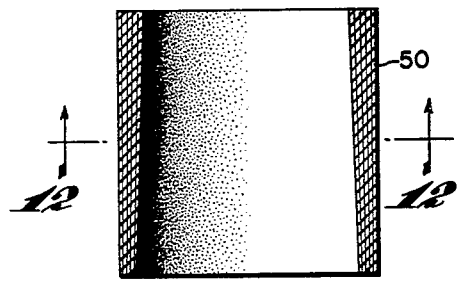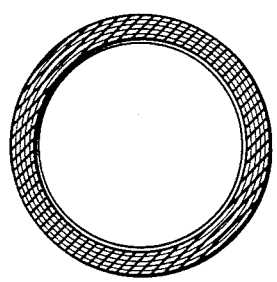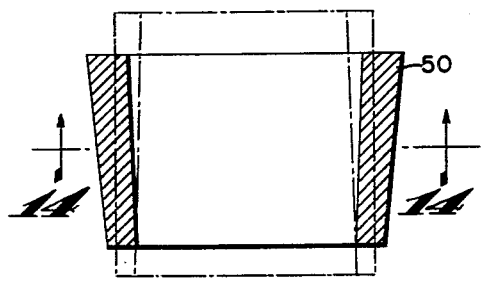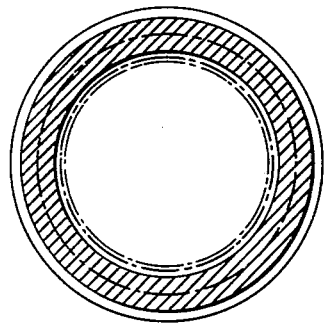

Oct. 6, 1964    D. SINKLER    3,152,205
METHOD OF MAKING A VALVE
Original Filed Dec. 13, 1956    5 Sheets-Sheet 5

INVENTOR.
DEAS SINKLER
BY
J. Warren Kinney Jr.
ATTORNEY 3,152,205
Patented Oct. 6, 1964

3,152,205
METHOD OF MAKING A VALVE
Deas Sinkler, 5790 Mad River Road, Dayton 9, Ohio
Original application Dec. 13, 1956, Ser. No. 628,039. Divided and this application June 30, 1960, Ser. No. 42,459
5 Claims. (Cl. 264—249)

This invention relates to valves, and more particularly to valves which have been designed to provide free turning of the valving member thereof. This is a division of application Serial No. 628,039, filed December 13, 1956, and now forfeited.

An object of the invention is to produce a valve having ribs therein for areas characterized by high sealing pressures between the valving means and valve body, said valve also having areas of reduced pressure.

Another object of the invention is to produce a valve with a sealing member disposed between the valving member and body to reduce the torque required to turn or operate the valve.

A further object of the invention is to produce a valve having the hereinabove described characteristics, having cavities provided therein to accommodate axial and radial expansion and contraction of the sealing means.

Still a further object of the invention is to produce a valve provided with a sealing member interposed between the valving member and body wherein high pressure sealing areas are established and maintained by expansion and contraction of the sealing member against ribs provided in the body or valving member.

Another object of the invention is to teach a method of utilizing a sealing member or sleeve of orientable material, the physical properties of which are improved by the method of manufacture or fabrication.

A further object of the invention is to produce a valve having the hereinabove described characteristics in which the properties of the sealing member are improved in the areas surrounding the flow passages thereof.

These and other objects are attained by the means described herein and as disclosed in the accompanying drawings, in which:

FIG. 1 is a top view of a valve embodying the teachings of the present invention.

FIG. 2 is a sectional view taken on line 2—2 of FIG. 1.

FIG. 3 is a view of FIG. 1 of the valve body, with the valving member, sealing member, diaphragm, cover and gland removed.

FIG. 4 is a sectional view on line 4—4 of FIG. 3.

FIG. 5 is a sectional view on line 5—5 of FIG. 4.

FIG. 6 is a sectional view taken on line 6—6 of FIG. 4.

FIG. 7 is a sectional view taken on line 7—7 of FIG. 4.

FIG. 8 is a section taken on line 8—8 of FIG. 4.

FIG. 9 is a sectional view taken through a pre-formed sealing member or sleeve of orientable material.

FIG. 10 is a sectional view on line 10—10 of FIG. 9.

FIG. 11 is a view similar to FIG. 9, showing the sleeve material after having been cold coined, showing the direction of orientation and lamination of the material.

FIG. 12 is a section on line 12—12 of FIG. 11.

FIG. 13 is an illustration of FIGS. 9 and 11 in superimposed relationship for purposes of providing an understandable comparison of their relative sizes and shapes.

FIG. 14 is a section on line 14—14 of FIG. 13.

Figure 15:
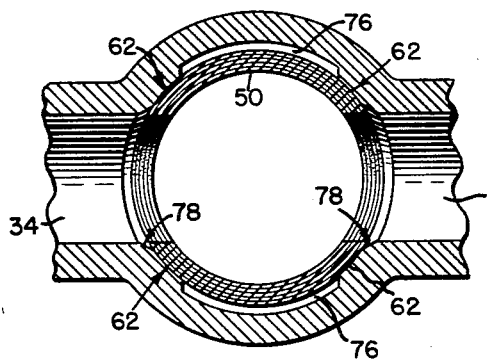
FIG. 15 is a partial view of the valve body of FIG. 7, with the sleeve of FIGS. 11 and 12 initially inserted therein.

With particular reference now to the drawings, the numeral 30 denotes generally a valve having a rotatable valving member. Said valve, as best illustrated in FIG. 2, may comprise a body member 32 having flow passages 34 therethrough and providing with a cylindrical or tapered bore denoted generally by the numeral 36 intersecting flow passages 34. The numeral 38 denotes generally a rotatable valving member which is preferably though not necessarily frusto-conical, having flow passages 40 therethrough which are adapted to be selectively aligned with flow passages 34 of the body. Shank 42 projects upwardly from the valving member, being provided at its upper end with flats 44 to facilitate the attachment of an operating lever 46.

The numeral 50 denotes generally a sealing member or sleeve of orientable material interposed between the adjacent faces of the valving member 38 and bore 36 of the body. A sealing diaphragm 52 is interposed between body 32 and a cover 54 which is held in sealing relationship with the body by means of studs 56 and nuts 58, as illustrated. A gland 60 threadably engages cover 54 for providing axial adjustment of the valving member while maintaining sealed relationship between the diaphragm and that member. It should be understood that the present invention is neither limited by nor directed to the specific structural details of the sealing diaphragm, cover and gland 60, said relationship being exemplary rather than restrictive.

With particular reference now to FIGURES 4, 5 and 7, the numeral 62 denotes continuous ribs which extend outwardly of and completely surround flow passages 34; the numeral 64 and 64a denote continuous outwardly projecting ribs located above and below said flow passages and which extend circumferentially of the bore in distinction to ribs 62 which are disposed radially with respect to the flow passages. The numerals 66 denote rib areas that are common to rib areas 62 and 64, whereas rib 66a is common to rib areas 62 and 64a. 68 and 68a denote vertical ribs to provide further locking of the sealing member or sleeve 50 against rotation and to increase the stability of the assembly against tipping of the valving member with respect to the body.

Projection 70 and 72 extend inwardly from the bore of the valve body and upward from the bottom of the bore of the valve body to provide locating seats for the bottom of the sealing member, extending, however, only partially across the wall thickness of the sealing member.

The numerals 74 and 74a represent cavities disposed above rib 64 and below rib 64a, respectively; whereas the numeral 76 denotes a cavity intermediate ribs 62 which circumscribe the flow passages 34 and intermediate ribs 64 and 64a which circumscribe the bore above and below the flow passages.

In the preferred embodiment of the invention the bore-adjacent ends of flow passages 34 of the body are provided with additional areas of enlarged diameter which have been indicated by the numerals 78 in FIGS. 4, 5, 7, 15, 16 and 17. It will be noted that the enlarged areas 78 completely surround and circumscribe the intersection of the flow passages 34 with bore 36 through the body, said areas 78 being chamfered; by way of example.

According to the teachings of the present invention, sleeve 50 may be fabricated from a rigid material such as Monel metal, copper, brass, and other similar substances having inherent self-lubricating and anti-galling properties. The sleeves may likewise be fabricated from resilient material such as rubber, by way of example.

However, it is preferred that the sleeve be of a material that is characterized by having resilience and elasticity under certain conditions, yet being subject to deformation under load in order to produce a strengthening effect by cold work or orientation in the areas where such strengthening is desired. The material should also be characterized by a low coefficient of friction, also for purpose of applications involving solvents, and other chemicals it should be characterized by inertness and resistance to corrosion. The sleeve material should likewise be such as to permit it to be used over wide temperature and pressure ranges.

The preferred sleeve materials include those of the polyethylene group, particularly the halogenated ethylenes which are characterized by outstanding resistance to corrosives and solvents and extremely low coefficients of friction.

Polytetrafluoroethylene (Teflon) is such a desirable material. It is, however, characterized by a relatively high linear thermal coefficient of expansion. It is also subject to permanent deformation under conditions of excessive pressure. It is therefore desirable to provide areas such as 74, 74a, 78 and 76 into which it can expand and contract with changes of temperature and/or pressure.

The preferred construction illustrated in FIG. 4 provides simultaneously:

(a) Locking of the sleeve in place with respect to the body.

(b) Areas of high sealing pressure 62, 64, 64a, 66 and 66a adjacent to and above and below the flow passages.

(c) Intermediate internal areas of substantially reduced pressure upon the valving member 38, FIGS. 2 and 4, for minimizing the torque required to operate the valve.

(d) Substantial cavities 74, 74a, 76 and 78 to accommodate expansion and contraction of the sleeve material minimizing the cold flow under severe conditions.

(e) The establishment of sealing pressure in the rib areas 62, 64, 64a, 66 and 66a by axial and radial contraction or expansion of the sleeve against the edges of said ribs upon cooling or heating.

Teflon is one of a number of plastic materials of the orienting type. Resistance to cold flow under pressure is materially increased by cold work. Specifically the tensile strength in the direction of working the material within and beyond its elastic limits is a function of the reduction in cross section. These orienting types of materials also have plastic memory. This means that a material, after having been deformed, has the tendency to return to its original shape.

Figure 16:
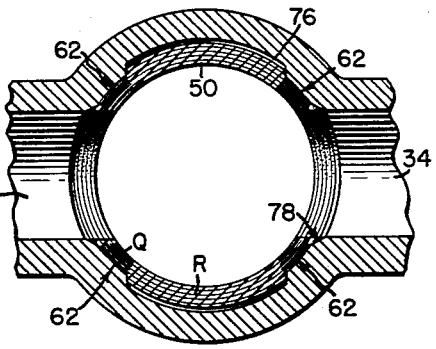
FIG. 16 is similar to FIG. 15, illustrating the sleeve as having been expanded into place by sizing.
Figure 17:
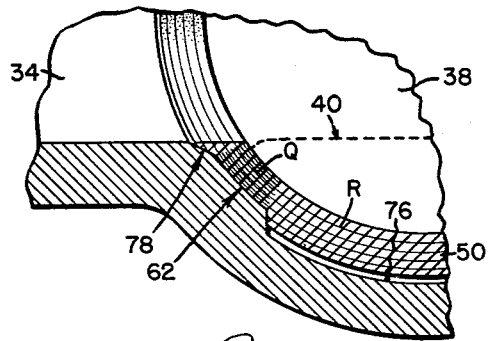
FIG. 17 is a greatly enlarged view of one of the ribs of FIG. 16 and the sleeve associated therewith, and illustrating a high pressure area of greater orientation and an area of reduced pressure and lesser orientation.

These properties are utilized in the preferred construction of this invention. The Teflon sleeve 50, FIGS. 9 and 10, is initially formed considerably shorter and with a substantially larger outside diameter than in its finished form. The sleeve is cured or sintered by heating to 700° F. for three hours and allowed to cool. It is then cold formed as in FIGS. 11 and 12 to reduce its outside diameter and reduce its cross-sectional area by 30% to 50% with a proportionate increase in length. In this condition it is so proportioned as to require substantial additional reduction in section by press fitting into the valve body as illustrated in FIG. 15. Subsequent enlargement of the inner and outer diameters is accomplished by means of a sizing plug. This operation causes additional orientation in the rib areas Q, as illustrated in FIGS. 16 and 17, by further reducing the section in these areas by approximately 25%. This sizing operation also causes the intermediate area R to expand into a locking relationship with the opposite sides of the ribs, 62, 64, 64a, 66, 66a, 68 and 68a. Such expansion, however, does not completely fill the expansion areas, as illustrated at 76 in FIGS. 15, 16 and 17, leaving sufficient room for expansion and contraction of the sleeve into the expansion cavities 74, 74a, 76 and 78 without completely filling them. Upon heating or cooling of the assembled valves, these locking areas of the sleeve further seal against leakage by expanding or constricting against the edges of the ribs.

Figure 20:
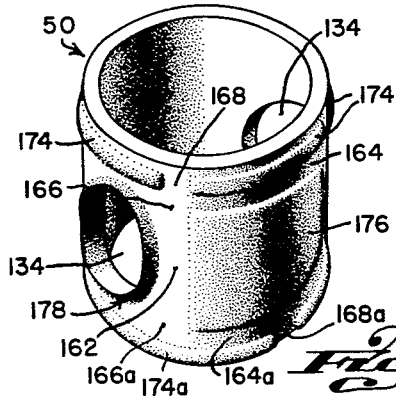
FIG. 20 is a perspective view of a sleeve as it would appear in a completed valve structure and showing its areas of maximum orientation and intermediate areas of lesser orientation.

With reference now to FIG. 20, I have illustrated an oriented sleeve of the type which is found in a completed, operable valve structure, and for clarity of detail and understanding the various mating areas of the sleeve have been designated by numerals 100 higher than the numerals designating the mating parts of the valve member, as follows 162, 164, 164a, 166, 166a, 168 and 168a denote areas of high compression which also provide areas of a relatively high degree of orientation, whereas the numerals 174, 174a, 176 and the chamfered area 178 denote areas of relatively lesser orientation.

In order to more thoroughly describe the problem solved by my invention, the following dissertation on the characteristics of Teflon will be helpful:

Teflon is furnished as a dry fluffy powder. It may be used pure or with fillers such as fiber glass which may be incorporated to improve its natural physical properties. The normal process for forming Teflon parts consist of compressing the powder cold in metal dies. The part is then removed from the mold and is sintered at approximately 700° F. for varying lengths of time depending on the mass and shape of the part being made. Upon removal from the furnace the hot sintered parts may be allowed to cool slowly to room temperature or may be quenched by rapidly cooling in water or some other suitable medium or may be hot coined in the preform die. Parts allowed to cool slowly have a relatively coarse grain, crystalline structure. Parts quenched have a much finer grain structure. Parts hot coined in a cold metal die tend to be quenched on the surface. Parts may be finished to accurate dimensions by either being hot coined and allowed to cool in the coining mold or they may be cold coined. Sometimes during the coining operation it is desirable to reduce the parts in section by compression beyond the elastic limit of the part in order to improve the physical properties of the Teflon.

Teflon molded by compression tends to have a laminar structure. The planes of lamination occur perpendicular to the axis of the direction of the force of compaction. In unoriented molded pure Teflon, the tensile strength in the direction of compaction is approximately 1500 p.s.i., while the tensile strength 90° to the direction of compaction is approximately 3000 p.s.i.

Orienting or cold work of Teflon by compression beyond its elastic limit results in the squashing and elongation of crystals into a fibrous type of structure vastly increasing its tensile strength in the direction of work, i.e. it is strengthened transverse the direction of reduction in section. Tensile strength may be increased to as much as 15,000 p.s.i. by cold work. Stiffness is also improved by cold work.

Teflon has plastic memory to its sintered uncoined shape. It may be deformed by subsequent operations or by use within or beyond its elastic limits and still be caused to return to its original sintered shape by resintering 700° F. It may also be caused to partially return to its original shape by heating to lower than sintering temperatures. Recovery in slightly oriented (5 to 15% reduction in section) Teflon will start to occur above 450° F. Teflon with medium orientation (15 to 35% reduction) will start to recover between 300° F. and 450° F. Fully orientated Teflon will have some recovery at any increase in temperature. The degree of recovery is a function of increase in temperature and/or the length of time the Teflon is exposed at a given temperature.

Orientation of Teflon tends to reduce its linear thermal coefficient of expansion in the direction of orientation upon heating and to increase its linear thermal coefficient of expansion upon cooling.

In the present invention the properties obtained in molding, quenching, and cold working are all utilized and are necessary for the optimum operation of the valves under different operating conditions.

In the drawings:

FIGS. 9 and 10 are sections through a preformed sleeve 50 for a 1" valve.

FIGS. 11 and 12 are sections through a cold coined sleeve for a 1" valve showing the direction of orientation and lamination of the Teflon.

FIGS. 13 and 14 are sections of the preform and coined sleeves superimposed to show the relative sizes and shapes. It is apparent that the plastic memory of the finished sleeve makes it want to recover becoming shorter and thicker and expanding in its O.D. and I.D.

FIG. 15 is a section of a 1" valve through the center line of the ports with the sleeve in place but not sized.

FIG. 16 is similar to FIG. 15, but with the sleeve expanded into place by sizing.

FIG. 17 is an enlarged view of FIG. 16 showing rib details, locking of the sleeves and the remaining expansion cavity.

Figure 18:
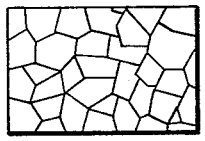
FIG. 18 is an enlarged diagrammatic view illustrating the approximate crystalline structure of a preferred sleeve material.

FIG. 18 is an enlarged view of the approximate crystalline structure of non-oriented Teflon.

Figure 19:
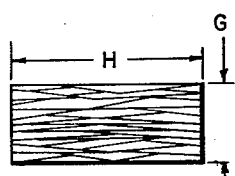
FIG. 19 is an enlarged view showing the fibrous structure of the material of FIG. 18 in oriented condition.

FIG. 19 is an enlarged view showing the fibrous structure of oriented Teflon, G being the direction of reduction in section and H being the direction of elongation of section.

In FIGS. 9 and 10 the preform is preferably made in a mold in which the cavity and force are both tapered to permit lateral compression of the powders. This causes the part to be laminar radially from the central axis. Parts of pure Teflon are preformed at pressures of 1500 to 3000 p.s.i. Parts of reinforced Teflon require pressures up to 15,000 p.s.i. or even greater in order to obtain non-porous parts of uniform density. The preferred tapers in the preform die for the present invention fall between 4° and 8° for the outer surface and between 2° and 6° on its inner surface. The relative taper between the two being held between 1½° and 2½°. Other relative tapers would be preferred for finished parts of different tapers.

After molding the preform is removed from the mold and is heated to 700° F. for a period of three hours or longer and is then water quenched from 700° F. to room temperature.

In FIGS. 11 and 12 the coined sleeve is preferably formed in a mold which reverses the tapers from the preform so as to obtain radial pressure on the sintered preform and to compensate for the inherent spring back so as to obtain a part which is cylindrical on the outside and tapered 2° per side on its inner surface.

The coined sleeve preferably has an outer diameter approximately .050" larger than the bore of the valve body into which it will be placed. The inner diameter is preferably the same size or slightly smaller diameter than the plug to be used in the valve.

In FIG. 15 the sleeve is pressed into the body, thus reducing both its inner and outer diameters, leaving approximately .063" clearance between the outer diameter of the sleeve and the relief area intermediate of the sealing and locking ribs.

In FIGS. 16 and 17 the sleeve is shown after a sizing operation consisting of forcing a tapered sizing plug, not illustrated, into the bore expanding the sleeve to partially fill the expansion cavity 76 and chamfer 78. This operation serves to further orient the sleeve in the areas Q, between the ribs 62 and the plug 38. This operation also serves to expand the sleeve into the chamfer 78, extending around the port 34 of the body, thus providing additional sealing around the port.

In order to properly describe how sleeves formed by the foregoing process supplement the rib expansion cavity construction in valves, it is necessary to describe in more detail the properties of pure and filled Teflon and more particularly how these properties are affected by molding and cold working procedures.

There are many reasons why the use of pure Teflon is desirable over the use of Teflon containing fillers. First of all it is chemically inert over a wide temperature range and has an extremely low coefficient of friction. Un-oriented pure Teflon, however, has a high thermal coefficient of expansion and relatively poor resistance to cold flow. For example:

Pure Teflon permanently deforms under a static load at 122° F. approximately 4 to 8 percent at 1200 lbs. per square inch. Permanent deformation at 2400 lbs. per square inch approximates 25 percent. This deformation, however, does not increase unless the load or the temperature increases. Thus a Teflon part that had been orientated by 25 percent reduction at say 2400 lbs. per square inch could safely be used up to that pressure without fear of further change in dimensions.

The use of fillers in molded Teflon is not new and serves to reduce the linear thermal coefficient of expansion, to increase resistance to cold flow and to increase stiffness. Fillers, however, introduce some other properties and conditions which may not be desirable. First, they tend to increase the coefficient of friction. Secondly they require considerably higher molding pressure in order to produce dense non-porous preforms. Many are subject to chemical attack in service. Others such as carbon, graphite, copper powder and other similar conducting materials can cause electrolytic cell corrosion of mating metal parts. In some cases the fillers themselves can actually contaminate the solution being handled, either by mechanically becoming unattached from the Teflon matrix or by chemical attack such as occurs in the case of calcium fluoride in the presence of sulphuric acid. The calcium fluoride reacts with sulphuric acid to liberate hydro-fluoric acid into the solution. In the case of certain desirable fillers such as fiber glass the molding powders become much more fluffy, thus requiring a much larger loading chamber in the preform dies. For example:

Pure Teflon has a bulk factor of 4 to 1. This means that a loading chamber of approximately three times the size of the finished piece. Teflon filled with 15 percent fiber glass, however, has a bulk factor of approximately 7½ to 1, therefore a loading chamber nearly twice the size of that required for pure Teflon is necessary in the preform. This not only makes the dies more expensive but also requires a longer stroke of the compressing force in order to accomplish the same results. This same glass filled Teflon powder also requires a compressive force of at least 15,000 p.s.i., in order to obtain parts that are dense and non-porous; thus in many cases a larger size press is required to obtain parts of the same dimensions as could be obtained on smaller presses in pure Teflon.

For the purposes of the present invention filled Teflon would be used primarily to reduce deformation under loan and to decrease the linear thermal coefficient expansion of Teflon. The same results, however, may practically be obtained by proper orientation of pure Teflon.

Sealing against leakage is a function of the unit pressure over the entire seal area. The torque required to turn a valve is a function of the pressure exerted in the sealing area and its coefficient of friction. Pure Teflon has a low coefficient of friction. It is well known that the addition of fillers substantially increases the coefficient of friction, particularly under increasing loads.

For service at low pressures and low temperatures, adequate sleeves can be made of pure Teflon with a minimum amount of cold working. This would provide for valve requiring a minimum of torque to operate and a minimum danger of corrosion or contamination of the solution being handled. With unoriented Teflon sleeves, valves can be made to satisfactorily handle pressures up to 150 lbs. per square inch and temperature swings in the order of 150° F.

Unoriented 15 percent glass filled Teflon sleeves extend the temperature range to approximately 200° F., however, sleeves of pure Teflon oriented by reduction of approximately 25 percent in section also perform satisfactorily in 200° temperature swings yet require considerably less torque to operate the valve than the glass filled sleeves.

The use of glass filled sleeves oriented by 25 percent reduction in area extends the useful temperature range to approximately 250° F., however, pure Teflon sleeves oriented by approximately 50 percent reduction in section also handle this temperature range with considerably less torque required to turn the valve. Higher pressures and temperatures can be handled with filled and unfilled Teflon which have correspondingly further reduction in section.

The following is a table of dimensions of a typical pure Teflon valve sleeve for a 1″ valve for service alternating from 50° F. to 300° F. in the varying stages of molding and insertion into the valve. Valves constructed with 15 percent fiber glass filled Teflon made by the same procedure would handle temperature swings from 50° F. to 350° F. but would require twice the number of foot pounds of torque to turn the plug.

A. *Dimensions at Centerline of Sleeve*

| Operation | | O.D. | I.D. | Wall | Length | Percent Reduction from Preform |
|---|---|---|---|---|---|---|
| Preform | Figs. 9 and 10 | 2.300 | 1.800 | .250 | 1.500 | |
| Quench | No figure | Water quench from 700° F. | | | | |
| Coin | Figs. 11 and 12 | 2.050 | 1.680 | 1.85 | 2.063 | 33 |
| Press Fit | Fig. 15 | 2.000 | 1.630 | .185 | 2.078 | 35 |
| Size | Figs. 16 and 17, relief areas 76. | 2.060 | 1.680 | 1.90 | 2.094 | 31 |
| | Figs. 16 and 17, ribs 62. | 2.000 | 1.680 | 1.60 | 2.094 | 43 |

From the foregoing, it will be noted that I have thus provided simple yet highly effective means for providing a valve which will require a minimum of torque in order to effect relative movement between the valving member and body member, and wherein means are provided intermediate or between the valving member and bore of the body member for providing a leakproof fit effective throughout wide variations in temperature, pressures and vacuums. It will be further noted that I have likewise utilized the means by which high sealing pressures are effected around the fluid passageways of the valve for positively securing and anchoring a sealing member in place relative to the valving member and body.

It should also be noted that the sealing member in the structure described may readily be removed and replaced in case of damage without the necessity of expensive machining and lapping.

It should also be noted that the valve requires no lubricant or packing, thus minimizing the danger of contamination of the fluids being handled.

It should be understood that the present invention covers not only the straight-way or two-port valve illustrated in FIG. 2 of the drawings, but any other type of multi-port valves.

It should likewise be understood that in certain instances it may be desirable to secure the sleeve member to one or the other of the mating members, viz., the valving member or body member, or both of them, by means of welding or cementing. The invention likewise contemplates the use of sealing members fabricated from materials having lower linear thermal coefficients of expansion from that of the mating parts, as well as material having higher linear thermal coefficients of expansion as described herein.

It should likewise be understood that the present invention contemplates a valve construction wherein the sealing member is secured to and carried by the valving member as well as by the body member, as illustrated; and also wherein two sealing members would be utilized when one of the sealing members is secured to and carried by the valving member and the other mating sealing member is secured to and carried by the body members.

Figure 21:
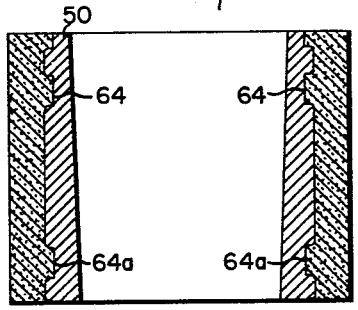
FIG. 21 is a sectional view illustrating the manner in which a valve, embodying the teachings of the present invention, may be fabricated by applying a moldable body material around a previously formed sleeve as in FIG. 20, and illustrating a construction which does not utilize cavities between portions of the sleeve and body, as illustrated in FIG. 17.

With reference now to FIG. 21, it will be noted that the numeral 50 denotes generally a sealing member formed substantially as illustrated in FIG. 20, and wherein a body-member-forming substance has been illustrated exteriorly thereof, being positively keyed or locked thereto as by means of ribs 64 and 64a; said body member being fabricated of a moldable material, such as, by way of example, but not of restriction, KEL-F (monochlorotrifluoroethylene), which moldable material might also be interposed between a metal body shell and the aforesaid sealing member.

In conclusion, it will be noted that various changes and modifications may be made in the structural details of the device, within the scope of appended claims, without departing from the spirit of the invention.

What is claimed is:

1. The method of providing selected areas of improved sealing properties and increased resistance to deformation under compressive load in an orientable, crystalline sealing member located between a valving member and the bore of the body of a valve, wherein the bore is provided with continuous raised areas which circumscribe the bore-adjacent-end of flow passages in the body and with recessed areas adjacent said raised areas; which method comprises the steps of reducing the diameter of the sealing member incident to inserting it in said bore while in a crystalline state, and of then cold working it by increasing its internal diameter for compressing it radially beyond its elastic limits over the raised areas in the bore while simultaneously forcing other portions of the sealing member to partially fill at least a portion of the recessed areas of the bore for locking said member therein.

2. Method of claim 1 wherein areas of greater orientation are produced in the sealing member over the raised areas, and wherein areas of lesser orientation are produced in the sealing member over the recessed areas, said sealing member being further received in said recessed areas incident to expansion and contraction of the sealing member.

3. The method of providing selective areas of improved sealing properties and increased resistance to deformation under compressive load in an orientable, crystalline sealing member in the form of a sleeve located between the valving member and the bore of the body of a valve, wherein the bore is provided with continuous raised areas which circumscribe the bore-adjacent-end of flow passages in the body and with recessed areas adjacent said raised areas, and wherein the outside diameter and thickness of the sleeve are initially greater than the final outside diameter and thickness of the sleeve; which method comprises the steps of initially compressing the sleeve while in a crystalline state for partially orienting it and reducing its dimensions for insertion into said bore, then cold working the sleeve by radially expanding it in the bore for compressing it beyond its elastic limits over the raised areas in the bore while simultaneously forcing other portions of the sleeve to partially fill at least a portion of the recessed areas of the bore for locking the sleeve therein, whereby areas of improved sealing properties and increased resistance to deformation are produced in the sleeve over said raised areas, and wherein areas of lesser orientation are produced in the sleeve over the recessed areas of the bore.

4. The method of producing selected areas of improved sealing properties and increased resistance to deformation under compressive load in an orientable, crystalline sealing member located between a valving member and the bore of the body of a valve; which method comprises the steps of providing continuous raised areas in the bore which circumscribe the bore-adjacent-end of the flow passages in the body and which project outwardly from other areas of the bore toward the valving member, initially cold working the sealing member while in a crystalline state by uniformly compressing it beyond its elastic limits for partially orienting it by reducing its section and elongating the crystals thereof, introducing said partially oriented sealing member into the bore, and of further cold working it by expanding it in said bore for further compressing it beyond its elastic limits over the raised areas in the bore and of simultaneously forcing other portions of the sealing member to fill at least a portion of the other areas of the bore for locking the sleeve therein, wherein those portions of the sealing member disposed over the raised areas in the bore are characterized by improved sealing properties and increased resistance to deformation under compressive load.

5. In a method of producing a sleeved valve having a valving member, a body member and a sealing member therebetween, and wherein the body member includes a bore having continuous raised areas therein which circumscribe the bore-adjacent-end of the flow passages in the body and which project inwardly toward the valving member, the steps of providing a sealing member of orientable crystalline material having a crystalline state and capable of reduction in section by working while in a crystalline state with sealing areas of greater reduction in section between those portions in contact with the raised portions of the bore, by first compressing the original sealing member beyond its elastic limits by cold working it for partially orienting it by reducing its section while in a crystalline state, further reducing the outer diameter of said member by compression for introducing it into said bore, and of further stressing said member to produce areas of greater orientation by further reduction in section over the raised areas in the bore while simultaneously forcing other portions of the sleeve material to partially fill the unraised areas of the bore for locking said member in the bore.

References Cited in the file of this patent
UNITED STATES PATENTS

| | | |
|---|---|---|
| 2,729,420 | Schenck | Jan. 3, 1956 |
| 2,961,214 | Freed | Nov. 22, 1960 |